Inventor
Pierre Kaelin
By Robert E. Burns
Attorney

Inventor
Pierre Kaelin
By Robert E. Burns
Attorney

Jan. 9, 1951 P. KAELIN 2,537,188

AUTOMATIC TELEPHONE STATION SELECTOR SET FOR TRANSMITTING STATION NUMBERS

Filed April 16, 1949 4 Sheets-Sheet 3

Inventor
Pierre Kaelin
By Robert E. Burns
Attorney

Jan. 9, 1951 P. KAELIN 2,537,188

AUTOMATIC TELEPHONE STATION SELECTOR SET FOR TRANSMITTING STATION NUMBERS

Filed April 16, 1949 4 Sheets-Sheet 4

Inventor
Pierre Kaelin
By Robert E. Burns
Attorney

Patented Jan. 9, 1951

2,537,188

UNITED STATES PATENT OFFICE 2,537,188

AUTOMATIC TELEPHONE STATION SELECTOR SET FOR TRANSMITTING STATION NUMBERS

Pierre Kaelin, Lausanne, Switzerland

Application April 16, 1949, Serial No. 87,958
In Switzerland June 14, 1948

22 Claims. (Cl. 179—90)

Figure 1:
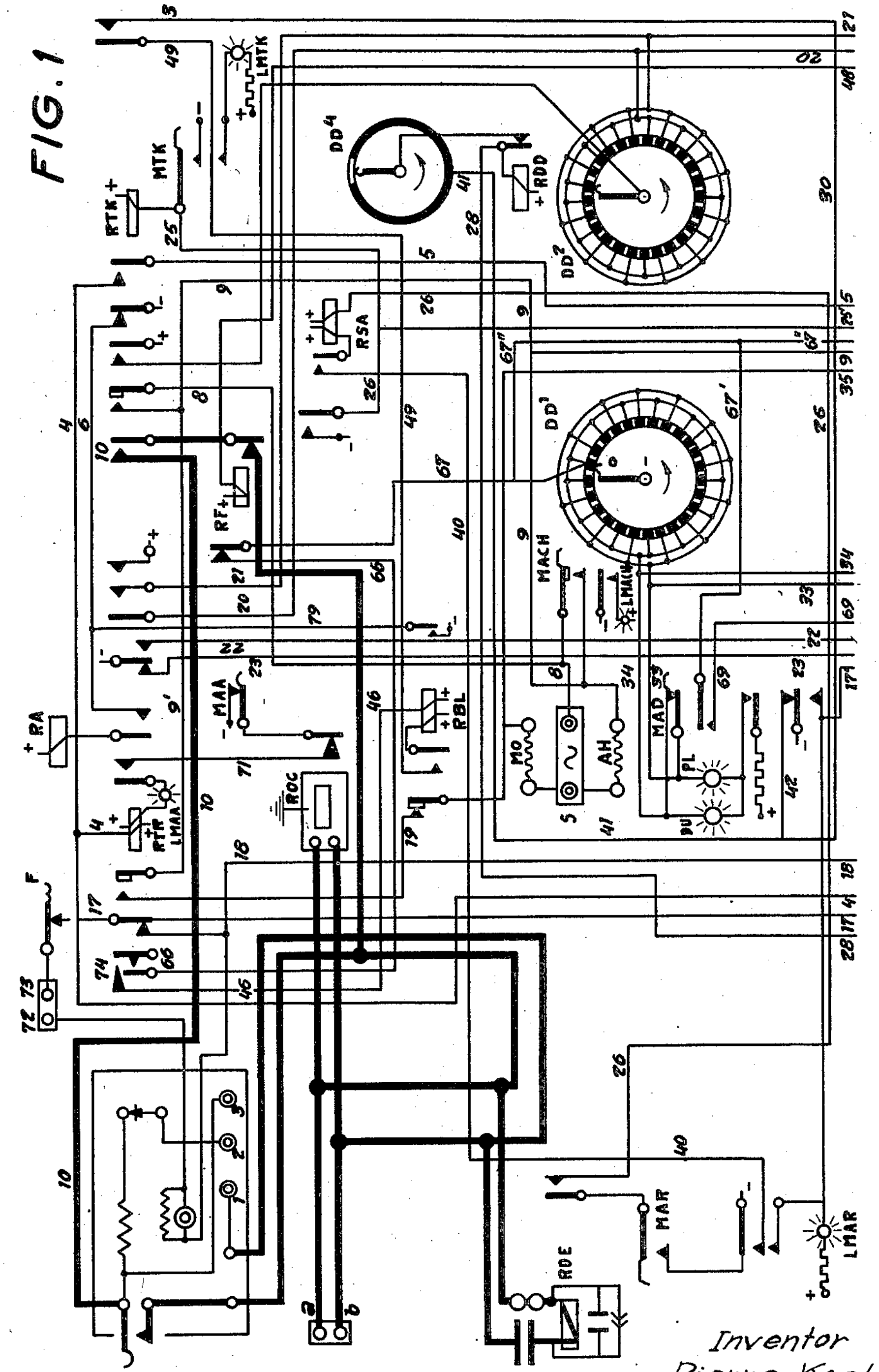

The present invention relates to a telephone set with a device for composing call-signs. This set is characterized thereby that it includes a device for recording at least one call-sign, automatic means to throw repeatedly on the line impulses which correspond to this sign and at least one member making possible the stoppage of the automatic means when the selection has been successful, all of this in such a manner as to produce automatically successive calls in case the line is busy until the telephone communication is obtained.

The novel arrangement according to the present invention and the objects and advantages of this arrangement will be apparent from the following description and claims in conjunction with the attached drawing showing by way of example an embodiment of the invention.

Figure 2:
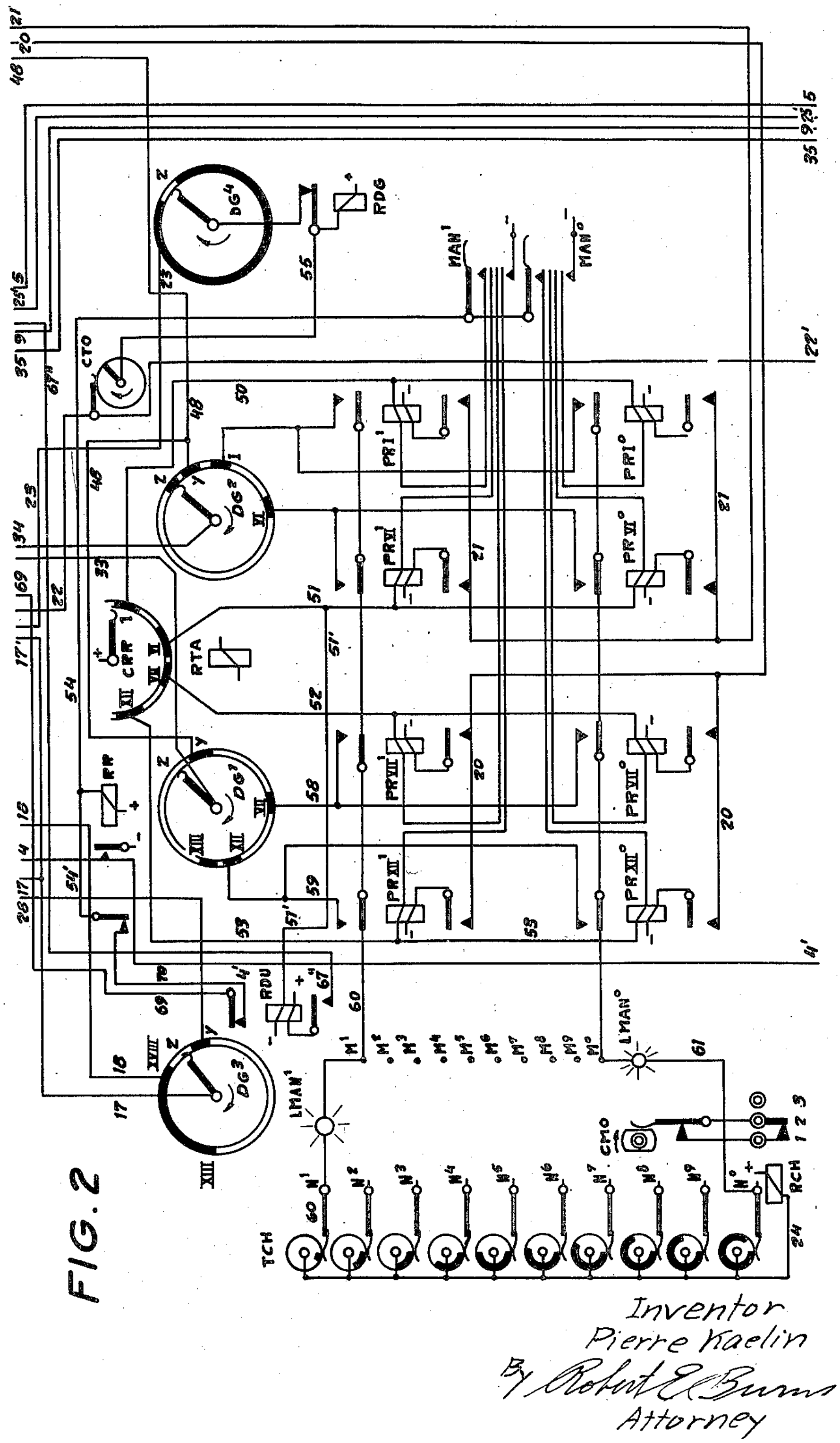
Figure 3:
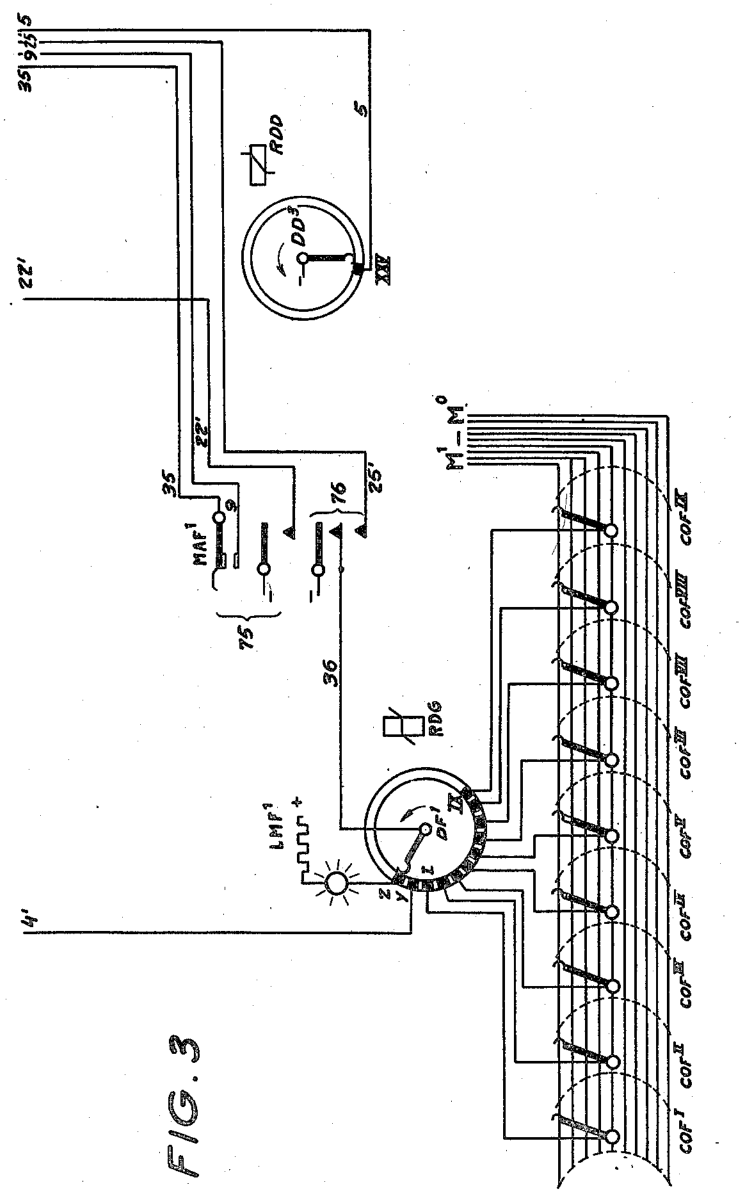
Figure 4:
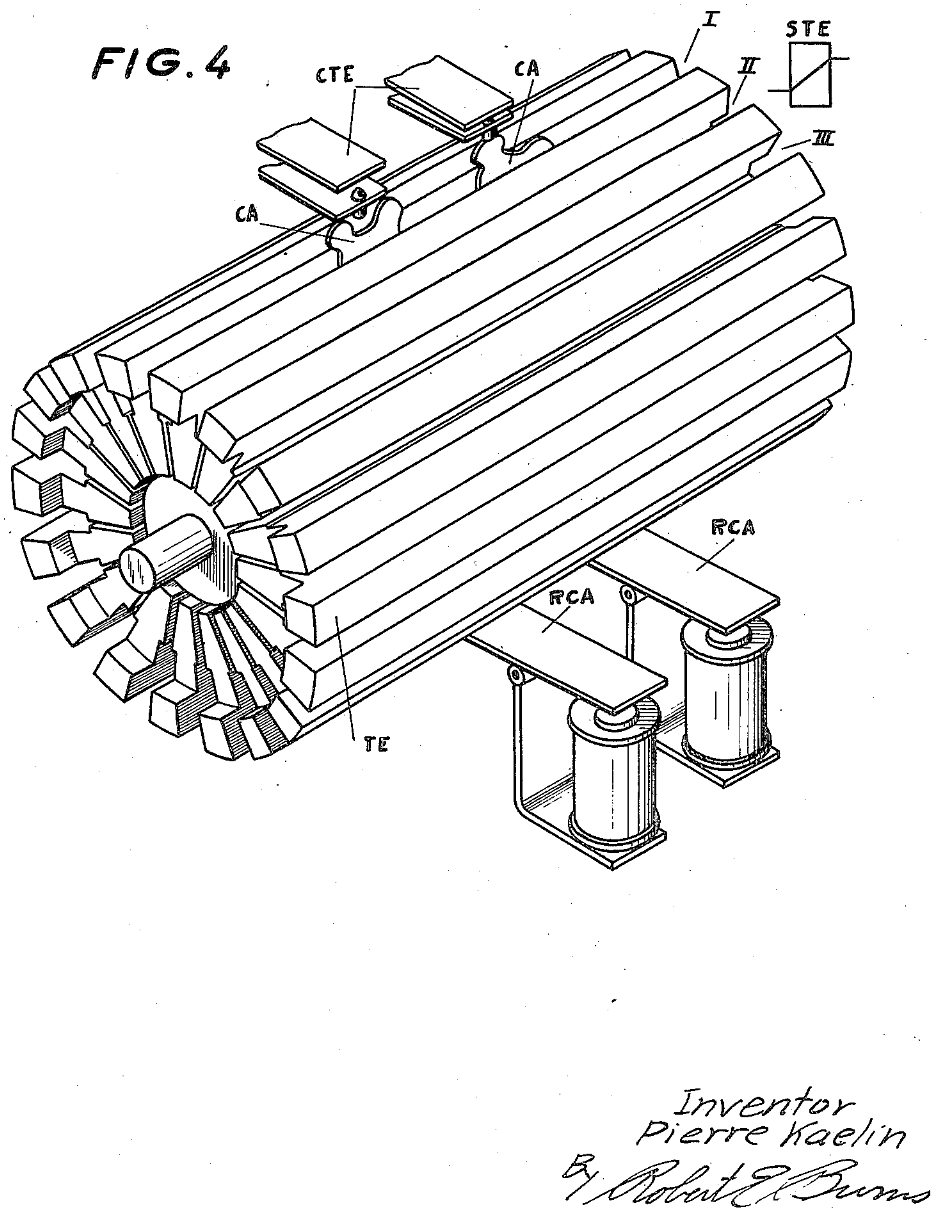

In the drawings:

Figures 1, 2 and 3 show respective parts of a diagram of an assembling of a telephone set according to the invention and must, in order to read the whole diagram, be considered as placed one above the other, Fig. 1 on top, Fig. 2 at the center, and Fig. 3 at the bottom; and Figure 4 is a perspective view of a detail of a variant.

The recording device for the call-sign is shown in Figure 2. It includes recording relays designated by PR, distributed in 12 groups of 10 relays each. Only four of these groups are partly represented, i. e. the first and last relays ($PRI^1$ and $PRI^0$) of the first group PRI and of the groups PRVI, PRVII and PRXII, respectively. The reasons which determine the numbers of the groups shall be explained further below. These relays are controlled by contacts MAN, 10 in number, $MAN^1$ through $MAN^0$, respectively, operated manually by means of keys forming a keyboard, which constitutes the device for composing the call sign. There shall be as many keys as there are MAN contacts, each key being connected with one of these contacts. The composing device of the call-sign could also include an ordinary disc, operated by hand and integral with a cam wheel. The keys of the keyboard which, for the sake of simplification, we shall designate by MAN, like the contacts, are equipped with control lamps LMAN. In general, in this set, the operating members containing control lamps are made of translucent material and the lamp is located behind the operating member, whether it is a key, knob, push-button or anything else.

The groups of relays PR are made dependent on a rotary switch CRR, which has as many contacts as there are groups of relays PR and which operates while the subscriber is composing a call-sign. The switch CRR sends current to each group of relays PR successively and is actuated by a recording relay RR. Thus, for a call-sign consisting of one number, each digit of the number shall be recorded in a different group of relays PR, each group including as many relays PR as there are possible digits, namely 10. This arrangement could easily be extended to call-signs consisting of letters or even of figures and letters. The number of groups is determined by the length and number of call-signs which the set must be capable of registering simultaneously. To compose No. 136, for example, the subscriber first of all will press the key 1 of the keyboard, which will close the contact $MAN^1$. Further below the process of the composition of a call-sign will be described in detail within the frame of the general operation of the set. It may be stated, however, that the switch CRR being at contact I, the relay $PRI^1$ will be connected. The subscriber presses on key 3, thus closing the contact $MAN^3$, the switch CRR then passes over the contact II and the relay $PRII^3$ is connected. The subscriber presses on the key 6, closing the contact $MAN^6$, the switch CRR passes over the contact III, thus connecting the relay $PRIII^6$, and No. 136 is then registered.

The automatic means for repeatedly throwing on the line impulses which correspond to the recorded call are represented mainly in Fig. 2. These means include a numbering drum TCH driven by motor MO (Figure 1). This drum TCH consists of juxtaposed cams, the number of which is equal to the number of relays PR per group. These cams act to close contact over a fraction of a turn of different length for each one of them, which fraction of a turn is a function of the figure it is intended to transmit. The motor further drives a cam wheel device CMO intended to throw impulses upon the line. The terminals of this cam wheel device, designated by 1, 2 and 3, are connected with corresponding terminals 1, 2 and 3 of Figure 1. As the terminals 1 and 2 are normally short-circuited, the impulses produced by the cam wheel CMO remain without effect. On the other hand, during the longer or shorter period of time during which one of the cams of the drum TCH operates, a numbering relay RCH is connected which acts to open the short-circuit of the terminals 1 and 2. During this period of time, the impulses are thrown on the telephone line designated by *ab* (Figure 1). The arms $DG^1$ and $DG^2$ of a distributor DG with 5 arms, $DG^1$, $DG^2$, $DG^3$, $DG^4$, and DF (Figures 2 and 3) cause each group of relays PR to cooperate successively with the numbering drum. The stepwise advance of the distributor DG is obtained by relay RDG which itself is actuated by a rotary contact CTO driven by the motor.

The main members of the set having thus been briefly described, the operation of same is as follows:

The making of an ordinary call includes two main operations: the composition of the number and the call proper.

For the composition of the number, the subscriber presses, for example, on the key $MAN^1$ of the keyboard, thus connecting the corresponding contact $MAN^1$. Through the wire 54 the relay RR is connected, causing the switch CRR, which was at rest at zero, to advance to position 1. The energizing of the relay RR also produces, through sending current into the wire 4, the energizing of a transit relay RTR (Figure 1), which will be held by the wire 71. The energizing of the relay RTR causes the wires 20 and 21 to be fed, likewise as the wire 22 leading to the rotary contact CTO, and, furthermore, causes the connecting of a cancellation relay RA, the subsequent releasing of which will produce, as will be shown later, the return of the switch CRR to zero. The energizing of the relay RTR finally produced the connecting of a lamp LMAA which thus lights up as soon as the first part of a call-sign is recorded. The switch CRR, having reached position I, the first group of relays PR is fed by wire 50 and the relay $PRI^1$ will be connected by the key $MAN^1$. The process is similar for any other figure constituting the call-sign. Once connected, the respective relays PR are held by the current fed through the wires 20 and 21.

After the desired call-sign is composed, the subscriber presses a switch MTK (Figure 1) equipped with a control lamp LMTK, which then lights up. It thus connects a relay RTK, which, upon being energized, closes the circuit of the line 10, and through wires 8 and 9 connects a loudspeaker provided with an amplifier designated by AH in circuit with an alternating current supply source S. Furthermore, it connects through the wires 9' and 19 the motor MO (the relay RTR being still connected) and releases by interrupting the wire 6 the cancellation relay RA. This releasing causes the return of the switch CRR to zero. The motor MO begins to rotate at a speed of 10/12 revolutions per second. At each turn of the motor, the rotary contact CTO actuates the relay RDG of the general distributor DG, sending current to same through wire 55, which causes the general distributor DG to advance one position, the different positions of the said general distributor being the following: Position Z: zero; next position Y (see $DG^2$): the fork relay RF (Figure 1) is fed through the wire 48, which causes the opening of the line circuit; positions I to XII: (see $DG^2$ and $DG^1$) the current fed through wires 34 and 33, respectively, energizes the numbering relay RCH through the closed contacts of the relays PR involved and through the cams of the numbering drum TCH. The current flowing to the cams of the drum TCH lights up the lamps LMAN mounted in series. The relay RCH breaks the short-circuit of the terminals 1 and 2 of the cam wheel device CMO driven by the motor at a speed six times greater than the drum TCH. As the cam wheel has a double contact, the impulses are sent at the normal rhythm (10 per second) and in a number corresponding to the number fixed by the relays PR. The cam wheel CMO could be replaced by a 12-contact cam mounted on the axle of the drum TCH, rotating at 10/12 revolutions per second, in which case the rhythm of the impulses would also be 10 per second. From position XIII and up to position XVIII (see $DG^3$), the listening circuit is connected with the loudspeaker, the terminals of which are designated by 72 and 73 (Figure 1), through the connection of the wires 17 and 18. If the line called is busy, the subscriber hears on the loudspeaker the busy signal; he keeps the set functioning, which resumes the same operation as described until the line is free, beginning in opening the line circuit (position Y of $DG^2$, see here above) what removes the busy tone, before sending anew the impulses. If the line is free, the subscriber hears the calling signal or the answer of the other party; he then presses on a stop push-button MAA (Figure 1) in order to release the transit relay RTR by cutting the wire 71; the control lamp LMAA is then extinguished. This releasing of relay RTR causes the motor to stop, as the wire 19 is no longer fed; the rotary contact CTO becomes immobilized; (furthermore, the wire 22 which feeds the rotary contact is no longer fed). On the other hand, the wire 23 receives current which through the arm $DG^4$ actuates the relay RDG, which causes the general distributor DG to advance until it is in position Z, that is to say until it has returned to zero. The handling of the push-button MAA may be replaced by the action of an occupation relay ROC (Figure 1), which operates as a charge relay as soon as the other party unhooks the receiver and which interrupts the wire 71. This interruption could likewise be effected by a relay reacting upon the impulses of a call-control-detecting current. The push-button MAA also makes it possible to cancel a wrong call-sign during the composition thereof by cutting the wires 20 and 21. The conversation takes place through the loudspeaker, the terminals 72 and 733 being those of the pick-up of the amplifier, and by microphone or else by loud-speaker operating as a microphone. However, it suffices to unhook a microtelephone, suspended on the cradle F, so that the loudspeaker be disconnected, the wires 17 and 18 being then disconnected (Figure 1). As described above, the connecting of the switch MTK produces the switching-on of the amplifier AH through the connecting of the wires 8 and 9. However, if the lamps of the amplifier AH are not lukewarm-heated lamps, then the loudspeaker will not be instantaneously audible. This is why a switch MACH equipped with a control lamp LMACH (Figure 1) makes it possible for the subscriber to connect the amplifier in a permanent manner.

When the subscriber himself is being called, he presses the button MTK, thus connecting the relay RTK, which results in closing the line circuit. The motor does not start because the transit relay RTR is not connected. If the subscriber does not want to hear the ringing of his set and if he wishes to avoid the manipulation customarily necessary for answering, he may make use of an automatic answer device. For this, he connects a switch MAR (Figure 1) equipped with a control lamp LMAR, which then lights. When a call comes from the outside, which always results in energizing a connecting relay RDE (Figure 1), the wire 26 is fed and a relay RSA is actuated, thus feeding the wire 25, which causes the connecting of the relay RTK. The relay RSA is held by the wire 40. The telephone line is then closed and the loudspeaker and the microphone start operating. The subscriber can thus speak without having made a single gesture. At the end of the conversation, it is necessary to release the switch MAR, which releases the relays RSA and RTK. The subscriber may immediately re-connect the switch MAR for the automatic receiving of subsequent calls.

The above described device for the recording of a call-sign is an electric device which includes mainly the groups of relays PR and the switch CRR. It could likewise be mechanical or electro-mechanical like the device shown in Figure 4. A rotary recording cylinder TE is provided with oscillatory cams CA pivotally mounted on its periphery. These cams are distributed in 18 groups of 10 (I, II, III, etc.), each group extending along a directrix of the cylinder and all these groups together occupying the entire cylindrical surface. The cams have a rest position and an operating position. Only two cams, each occupying one of these two positions, are shown in Figure 4. The cams CA are actuated by means of relays RCA, 10 in number (two of which are shown), namely one per cam of each group, and the relays in turn are controlled by the 10 contacts MAN of Figure 2. As above, these contacts are actuated by a device for the composing of the call-sign, which device consists of a keyboard containing as many keys as there are MAN contacts. The device could also include an ordinary disc, manually operated and integral with a cam wheel.

The cylinder TE is made dependent on a relay STE, diagrammatically shown, playing the part of the switch CRR, which has been eliminated. The relay STE operates when the subscriber composes a call-sign and causes the cylinder TE to turn to the extent of $^1/_{18}$ of a turn after each operation of a MAN key, so as to place each group of cams CA successively opposite the relays RCA. Thus for a call-sign consisting of one number, each digit of the number will be recorded in a different group of cams, each group including as many cams CA as there are possible digits, namely 10. This arrangement could easily be extended to call-signs consisting of letters or even of figures and letters. The number of groups will be determined by the length and by the number of signs which the set should be able to record simultaneously. In order to compose the number 271, for example, the subscriber first of all presses on the key $MAN^2$ of the keyboard, which closes the corresponding $MAN^2$ contact. The group I of cams CA being opposite the relays RCA, the cam $CAI^2$ will be brought to the operating position. The subscriber presses on the key $MAN^7$; the relay STE causes the cylinder TE to turn to the extent of $^1/_{18}$ of a turn so as to bring the group II of cams CA opposite the relays RCA and the cam $CAII^7$ is shifted. The subscriber presses on the key $MAN^1$, the relay STE brings the group III of cams CA opposite the relays RCA, and the cam $CAIII^1$ is shifted. The number 271 is then recorded.

The relays RCA and STE could be replaced by mechanical transmission members. Thus the drum could be continuously incited to rotate by the motor MO, through a friction coupling. An escapement wheel mounted on the shaft of the drum and an anchor controlled by the keyboard MAN would make it possible to effect the stepwise advance of the drum.

In the case of the recording cylinder, the automatic means to throw repeatedly over the telephone line impulses which correspond to the recorded call-sign are identical with those of the previously described example. The relays PR being eliminated, the number drum TCH is fed through 10 contacts CTE which can be closed by the cams CA placed in operating position. These contacts CTE serve furthermore the purpose of lighting the lamps LMAN. The general distributor DG acts as previously in connection with the motor MO. It causes the intermittent rotation of the cylinder TE so that the various groups of cams successively actuate the contacts CTE. A suitable device (not shown) is provided for returning the cylinder TE to its initial position at the time of the call proper, that is to say, at the time when the subscriber presses on the switch MTK, this cylinder TE having successively turned to the extent of several fractions of turns during the recording of the call-sign. Instead of being carried along by the general distributor, the cylinder TE could also be carried along by the motor MO while the call-sign is being transmitted over the telephone line.

The electric recording device which has been described by way of example includes 12 groups of relays PR which make it possible to record at the same time two call-signs of 6 digits each. The electro-mechanical device described above includes 18 groups of cams CA making it possible to record two signals of 9 digits each. Obviously like devices could easily be conceived for making it possible to record more than 2 call-signs, and longer call-signs. The device which will be described below and which mainly includes a stepwise finder with four arms DD, namely $DD^1$, $DD^2$, $DD^4$ (Figure 1), and $DD^3$ (Figure 3), makes use of this possibility to record two call-signs for enabling to call successively two parties whose call-signs have been composed one immediately after the other.

The subscriber composes the first call-sign on the keys MAN, then he operates switch MAD (Figure 1) and composes the second call-sign. The closing of switch MAD produces at first the advance of the switch CRR up to the contact VI, irrespective of the contact (from I to VI), on which the composition of the first call-sign was completed, so that the composition of the second call-sign always starts on contact VII. This advance is effected in the following manner: The operation of switch MAD produces the connecting of the wire 67′ (fed by the finder $DD^1$ in position 0 through wire 67″ with the wires 69—70—54′ (Figures 1 and 2). The relay RR is connected, which causes the switch CRR to advance. The latter, once it has reached the contact VI, feeds the wire 51—51′, thereby energizing a relay RDU (Figure 2) which is subsequently held by the wire 67″ and which will be released when the finder $DD^1$ has left the contact 0, that is to say, when the composition of the second call-sign has started. The connecting of RDU produces the disconnecting of the wires 69—70; the relay RR is no longer fed and the switch CRR stops on the contact VI. The composition of the second call-sign starts therefore on contact VII of switch CRR and is effected in a manner identical to that of the first call sign. The connecting of MAD furthermore results in lighting two control lamps designated by DU and P1, respectively, in breaking the short-circuit of the wires 33 and 34 and in sending current through the wires 17′—17 to the general distributor $DG^3$. The two control lamps may, for example, bear the letters DU and PLEX forming the word DUPLEX, which suggests the idea of the double call. The wires 33 and 34 lead, respectively, from the distributors $DG^1$ and $DG^2$ to the stepwise finder $DD^1$, all the odd contacts of which are connected by the wire 33 with $DG^1$ and all the even contacts of which are connected by the wire 34 with $DG^2$. The finder $DD^2$ serves, as will be seen, for holding one of the numbers while the communication takes place with the other. Its odd contacts are connected by wire 21 with the relays PR, which are dependent on the distributor arm $DG^2$, and its even contacts are connected by a wire 20 with the relays PR, which are dependent on the distributor arm $DG^1$. If at the moment the call is thrown on the line, $DD^1$ is on an even contact, or more generally, on 0, the impulses of the first call-sign are transmitted over the telephone line by the distributor $DG^2$. If the line of the party called is busy, the general distributor DG continues its travel. At the position Y of the distributor arm $DG^3$, current is sent by the wire 28 to a relay RDD, which controls the advance of the finder DD. The finder $DD^1$ then advances onto the next contact, an odd contact, and it is the distributor $DG^1$ which sends the impulses of the second number over the telephone line. During this time, the lamps DU and PL light up alternatingly according to whether the first or second number is transmitted over the line and the signals (call, busy, etc.) are transmitted by the loudspeaker. As soon as a line is free, the subscriber presses the stop push-button MAA and the conversation takes place. As was seen above, the operating of the push button MAA produces the return of the distributor DG to 0, and the disconnecting of the relays PR. However, some of the PR relays, namely precisely those composing the number not yet obtained, are held by the maintaining current coming from $DD^2$ over the lines 20 or 21.

When the first conversation is over, the subscriber releases the switch MAD so that the lamps DU and PL are no longer fed, nor is the distributor $DG^3$; the lines 33 and 34 are short-circuited, and current is sent through the wires 42 and then 41 to the arm $DD^4$ which feeds the relay RDD. The latter causes the finder DD to advance up to zero position. While returning to zero, the arm $DD^3$ (Figure 3) passes over the contact XXV, thus sending current through the wire 5 and through the wire 4, the relay RTK being still connected, which results in again connecting the transit relay RTR. This connecting produces, as was seen above, the starting of the motor MO. The searching for the second number, maintained by $DD^2$ during the first communication, starts. The relays PR are of the slow releasing type, so that they do not become disconnected between the moment when $DD^2$ starts its return to 0 and the moment when the arm $DD^3$ passes over contact XXV. From that time on, RTR being energized, the wires 20 and 21 are again fed and hold the relays PR.

The set may also be provided with a device, which makes it possible for the subscriber to prepare and retain one or more fixed numbers which he frequently uses and which he may subsequently throw over the line by simply manipulating a single switch. This device mainly includes a series of switches COF represented in Figure 3. There may be as many series of switches as there are fixed numbers desired to be used in the set.

The example represented includes a single series of switches for a single fixed number. This series includes nine switches COF so as to be able to prepare a nine-digit number. Each switch has as many positions as there are digits possible, namely ten, and may be operated manually by the subscriber. Each position is a double contact position, one contact serving for the lighting of the lamps LMAN. Nine drums with figures (now shown) indicate what number is being prepared. The subscriber who wishes to call a prepared number presses on a button $MAF^1$ equipped with a control lamp $LMF^1$, which then lights up, as current is sent through the wire 36 to the arm $DF^1$ of the distributor DG which is in its Z position. The advance of the distributor DG is again controlled by the relay RDG. The operation of the button $MAF^1$ likewise produces, through the wires 25′—25, the connecting of the relay RTK, the feeding through wire 22′ of the rotary contact CTO and the starting of the motor MO through the wires 35—9—8. The motor is then in operation as long as a pressure is exercised on the button $MAF^1$ and the rotary contact CTO actuates the relay RDG, which controls the operation of the distributor $DF^1$. When the distributor $DF^1$ has advanced one step, namely after the first turn of the contact CTO, it has reached position Y, the lamp $LMF^1$ is extinguished and the transit relay RTR (Figure 1) is connected through the wires 4′—4. The motor MO is then fed by the wires 19—9′—8, so that the button $MAF^1$ can be released. The button $MAF^1$ is a single action button for the contacts designated by 75, that is to say, it is necessary to continue pressing the button to keep these contacts closed, and it is a double acting button for the contacts designated by 76, that is to say, these contacts remain closed after the button is released and a new pressure on this button is necessary to release them. The operation of the button $MAF^1$ lasts only a brief moment. The distributor $DF^1$ then operates in a manner similar to that of the distributors $DG^2$ or $DG^1$. The wires of the series of switches COF are connected with the terminals $N^1$ to $N^{10}$ of the numbering drum TCH. When the call has been put through, the subscriber presses the button MAA, in order to release the transit relay RTR and to stop the motor as was described previously. At the end of the communication, the subscriber releases the button MAF, namely, the contacts 76 which alone have remained connected. There are as many buttons MAF, arms DF′ and series of switches COF as there are fixed numbers to be prepared in the set.

When the subscriber must, during a conversation, take note of a number, he may, instead of writing it and subsequently composing it, compose it immediately on the keyboard by means of a motor blocking device, which device includes a blocking relay RBL (Figure 1) and operates as follows:

During the ordinary manipulation of the MAN keys, the transit relay RTR is energized, but the relay RTK is kept disconnected. Upon energizing the RTR relay actuates an impulse contact 74, connecting the wire 66 with the wire 46 (the wire 66 is fed by the wire 67, the finder $DD^1$ remaining at zero). The contact 74 being an impulse contact, the wire 46 is fed for only one instant, which results in energizing the blocking relay RBL which is ordinarily immediately released again. In case of simultaneous recording, however, the MAN keys are manipulated at a time when a communication takes place, that is to say, at a time when relay RTK is already connected. The relay RBL, connected the moment contact 74 is actuated, then is held by means of the current sent to it through the wires 49—30—42, the contact between wires 49 and 30 being closed by relay RTK. The relay RBL remaining connected, cuts the wire 19 and thereby prevents the motor MO from starting. On the other hand, the connecting of the relay RBL causes the feeding of the wire 79, whereby the cancelling relay RA is held in spite of the energizing of relay RTK. At the end of the conversation, the subscriber releases the switch MTK, thus releasing the relay RTK, which cuts the communication between the wires 49 and 30 and releases the blocking relay RBL. The motor does not yet start because, the relay RTK being released, the wires 8 and 9' are not connected. It suffices for the subscriber to again press on the button MTK in order to reenergize the relay RTK and thereby to start again the motor in order to transmit over the line the number, which was composed during the first communication.

It will be advisable to equip the set with a device, in particular a switch, making it possible for the subscriber to check up on the duration of his communication by means of a clockwork with luminous dial, in particular in the case of long distance communications. Furthermore, the set may be provided with a recording device intended to register, on paper tape, for example, indications which make it possible to control some of the functions of the apparatus. Thus the call-signs may be entered at the time of their composition; special annotations indicating the exact moment of this composition, and also the charges can be likewise entered.

What I claim and desire to secure by Letters Patent is:

1. In a telephone set connected to a telephone line, the combination of means for manually composing a call-sign, recording means, means whereby said recording means are actuated by said composing means for recording at least one call-sign, means for transmitting impulses over the telephone line, automatic means, means whereby said automatic means cooperates with said recording means and controls said impulse transmitting means, said automatic means including means to make said impulse transmitting means to successively and repeatedly send call-sign impulses over the telephone line corresponding to a call-sign recorded, means for opening the telephone line before each sending of said impulses, means for setting said automatic means in operation after a call-sign has been recorded, means whereby a selected line is connected, means for releasing said automatic means responsive to the connection of said selected line, and indicating means for enabling the subscriber to be signalled that the call has been established, said indicating means dispensing with the necessity of the receiver being held against the human ear.

2. A telephone set according a claim 1, in which said indicating means comprises a loudspeaker connectable in the telephone line making it possible to hear the operation of said automatic means and moreover to listen to the party called.

3. In a telephone set connected to a telephone line, the combination of a plurality of switch means for manually composing a call-sign; means for recording said call-sign, comprising a number of groups of recording relays, the number of these groups being at least equal to the number of elements in said call-sign and the respective relays in said groups each cooperating with a corresponding contact of said hand switch means in such a way that upon the composition of a call-sign through said hand switch means one relay is energized in each successive relay group involved for each element of said call-sign and held until the call is put through; contact means associated with each relay and actuated upon energizing thereof; automatic distributor means for feeding current to said contact means of said several relay groups successively and repeatedly; means for transmitting impulses over the telephone line; control means coupled to said relay contact means for controlling said impulse transmitting means depending on which of said relay contact means has been actuated; means for setting said automatic distributor means in operation after a call-sign has been recorded; means whereby a selected line is connected to the calling line and means for releasing said automatic distributor means when the selected line is free and the call has been put through.

4. A telephone set according to claim 3 in which said switch means for manually composing a call-sign comprises a keyboard with a like number of keys as there are recording relays in a relay group, said keys upon manipulation temporarily closing a circuit for energizing the recording relays involved.

5. In a telephone set, the combination of a plurality of switch means for manually composing a call-sign; means for recording at least one call-sign, comprising a number of groups of recording relays, the number of said groups being at least equal to the number of elements in a call-sign and there being as many recording relays in one group as there are switch means; a distributor having a contact arm movable stepwise over a like number of contacts as there are relay groups, the relays of a group being connected on the one hand to a same contact of said distributor and on the other hand to the respective contacts of said hand switch means; a current supply source in circuit with said distributor arm and said hand switch means; relay means for stepwise advancing said distributor arm and actuated on each manipulation of said hand switch means; a holding relay actuated upon energizing of said relay means and serving to close a circuit for holding said recording relays after energizing thereof; second relay means for returning said distributor arm to zero position and operating upon releasing of said holding relay; contacts associated with said recording relays and closed upon energizing thereof; automatic second distributor means having at least one contact arm movable stepwise over a series of contacts; a rotatable contact drum having a like number of interconnected segmental contact means cooperating with fixed contacts as there are recording relays in a group, each segmental contact having a distinct length, the said recording relay contacts of a recording relay group being connected on the one hand to a same contact of said automatic second distributor and on the other hand to the respective fixed contacts of said contact drum; a third relay means connected in circuit with said segmental contact means, with said second distributor arm and with a current supply source; means for transmitting call-sign impulses over the telephone line, controlled by said third relay means; means for setting said automatic second distributor and said contact drum in operation after a call-sign has been recorded; and means for releasing said second distributor and said contact drum when the selected line is free and the call has been put through.

6. In a telephone set, the combination of means for manually composing a call-sign; means for recording said call-sign, comprising a rotary cylinder provided with a plurality of groups of cams, the cams of each group being pivotally mounted along a generatrix of the cylinder, each of these cams capable of occupying a rest position and an operating position; means actuated by said composing means and placed opposite a generatrix of said cylinder, for moving one cam of a group at a time from said rest position to said operating position; means for rotating said cylinder upon each operation of said composing means over such an angle as to put the next group of cams opposite said cam actuating means; contact pairs of a number equal to the number of cams in a group and placed in a line opposite a generatrix of said cylinder, one opposite each cam of a group, in such a way that a contact pair is actuated by a corresponding cam, when said cam is in its operating position and the group of cams it belongs to is rotated to a position opposite said line of contact pairs; means for returning said cylinder to a zero position after composition of a call-sign; automatic means for stepwise rotating said cylinder so as to place each group of cams opposite said line of contact pairs successively and repeatedly; means for transmitting call-sign impulses over the telephone line; control means actuated upon the closing of said contact pairs, for controlling said impulse transmitting means in correspondence with which of said contact pairs of a group is closed; means for setting said automatic cylinder rotating means in operation after a call-sign has been recorded; and means for releasing said automatic cylinder rotating means when the selected line is free and the call has been put through.

7. A telephone set according to claim 6, in which said manually composing means comprises a keyboard, the keys of which acts upon said cams of said recording cylinder to bring them into their operating position.

8. A telephone set comprising at least one series of manually operable switches, means whereby each is capable of occupying several positions, means for composing and fixedly recording at least one call-sign; an automatic distributor having at least one contact arm movable stepwise over a series of contacts including means for putting said switches successively and repeatedly in circuit, each of said switches being connected to one of said distributor contacts; means for transmitting call-sign impulses over the telephone line; control means coupled to the several contacts of said switches for controlling said impulse transmitting means depending on which of said switch contacts is closed; means for setting said distributor in operation; means for connecting the selected line to the calling line and means for releasing said distributor when the selected line is free and the call has been put through.

9. In a telephone set, the combination of means for manually composing a call-sign; means for recording a call-sign, means for actuating and releasing said recording means, said recording means being actuated upon manipulation of said composing means and released after a call has been put through; automatic means for successively and repeatedly feeding current to said recording means; at least one series of manually operable switches, means whereby each is capable of occupying several positions, for composing and fixedly recording at least one call-sign; an automatic distributor having a contact arm movable stepwise over a series of contacts including means for putting said switches successively and repeatedly in circuit, each of said switches being connected to one of said distributor contacts; switch means for connecting said automatic means or said distributor; means for setting said automatic means and said distributor in operation, means whereby the selected line is connected to the calling line and means for releasing said automatic means and said distributor when the selected line is free and the call has been put through.

10. In a telephone set, the combination of means for manually composing a call-sign; means for recording at least one call-sign, comprising a number of groups of contacts, actuated upon manipulation of said composing means in accordance with the call-sign composed; automatic means for feeding current to said series of contacts successively and repeatedly; a rotatable contact drum provided with a number of segmental contact means of different length cooperating with fixed contacts connected to the respective contacts of each group of recording contacts; relay means connected to said segmental contact means; a rotatable cam wheel cooperating with a contact pair placed in the telephone line, so as to open and close said contact pair at least once on each rotation; a second contact pair connected in parallel with said first contact pair and actuated upon energizing of said relay means to be opened only during the several distinct time periods the circuit of said relay means is closed by one of said segmental contact means, thereby regulating the number of impulses transmitted over the telephone line by the successive opening and closing of said cam wheel actuated contact pair depending on which one of said segmental contact means is current fed through the closing of one of said recording contacts; means for putting said automatic feeding means, said contact drum and said cam wheel in operation after a call-sign has been recorded; and means for releasing said automatic feeding means, contact drum and cam wheel when the selected line is free and the call has been put through.

11. In a telephone set connected to a telephone line, the combination of a plurality of switch means for manually composing a call-sign; means for recording at least one call-sign, comprising a number of groups of contact pairs actuated upon manipulation of said composing means in such a way that one contact pair in each contact group involved is actuated for each composing element of said call-sign; means for transmitting call-sign impulses over the telephone line; control means connected to said recording contact pairs for controlling said impulse transmitting means depending on which of said contact pairs has been actuated by said composing means; an automatic distributor having several contact arms movable stepwise over a number of contacts, said groups of recording contact pairs being connected each to a contact of said distributor, thereby to be successively and repeatedly current fed by said distributor arms; relay means for advancing said distributor arms; a rotary contact in series with said relay means for intermittently energizing said relay means; a motor driving said rotary contact; a hand switch for putting the call through after the recording of a call-sign; a second relay energized by the closing of said hand switch thereby closing a switch in the telephone line and closing a switch in the circuit of said motor; means whereby the selected line is connected to the calling line and switch means for interrupting said motor circuit when the selected line is free and the call has been put through.

12. In a telephone set, the combination of a plurality of switch means for manually composing call-signs; means for recording at least one call-sign, comprising a number of groups of recording relays controlled by said switch means, each recording relay acting on a contact pair, in such a way that one recording relay is energized and thereby one contact pair closed in each group involved for each composing element of a call-sign; a holding relay energized and held upon operation of said composing switch means, thereby closing a circuit for holding said energized recording relays; means for transmitting call-sign impulses over the telephone line; control means connected to said recording contact pairs for controlling said impulse transmitting means depending on which of said recording relays has been actuated; an automatic distributor having several contact arms movable stepwise over a number of contacts, said groups of recording relay contact pairs being connected each to a contact of said distributor so as to be successively and repeatedly put in circuit with a current supply source and with said control means by at least one of said distributor arms; relay means for advancing said distributor arms; a rotary contact in series with said relay means for intermittently energizing said relay means; a motor for driving said rotary contact; a hand switch for effecting the call after recording of a call-sign; a second relay being energized on the closing of said hand switch, thereby closing a switch in the telephone line and a switch in the circuit of said motor; a further relay switch in said motor circuit actuated by said holding relay; a third relay operating on a second switch in the telephone line; a contact on said distributor actuated prior to said distributor contacts, which are connected to said recording relay contacts, for closing a circuit comprising said third relay to open the telephone line temporarily prior to the transmission of the call-sign impulses; means for releasing said holding relay, to be actuated after the call has been put through, thereby cutting said motor circuit and said recording relay holding circuits; and further contact means on said distributor for closing a circuit feeding current to said distributor arm advancing relay means after the releasing of said holding relay, to advance said distributor arms to zero position.

13. A telephone set according to claim 12, in which the means for releasing the holding relay after the call has been put through comprises an automatic device connected to the telephone line and reacting to impulses of a charge meter current.

14. A telephone set according to claim 12, in which the means for releasing the holding relay after the call has been put through comprises an automatic device coupled to the telephone line and reacting to the impulses of a call-detecting current.

15. A telephone set according to claim 12, in which the means for releasing the holding relay after the call has been put through comprises a push-button and a control lamp lighting up on the energizing of said holding relay and extinguished upon releasing of said holding relay by the manipulation of said push-button.

16. A telephone set according to claim 12 with means permitting the recording of a call sign during communication over the telephone line, said means comprising a blocking relay, an impulse contact actuated by said holding relay and placed in series with said blocking relay to briefly energize said blocking relay upon operation of said holding relay, a circuit for holding said blocking relay after energizing thereof, said circuit comprising a holding contact closed upon the closing of said hand switch for effecting a call and a third switch in said motor circuit actuated by said blocking relay so as to be opened upon energizing of the relay.

17. In a telephone set, the combination of a plurality of switch means for manually composing a call sign; means for recording several call signs at the same time, said means comprising a plurality of groups of contact pairs, said plurality of groups being divided in several parts, each part comprising a number of groups at least equal to the number of elements in a call-sign, and said recording contact pairs being actuated by said composing means in such a way that one contact pair in each contact group involved is closed for each composing element of a call-sign; means for transmitting call-sign impulses over the telephone line; control means connected to said contact pairs for controlling said impulse transmitting means depending on which of said contact pairs has been actuated by said composing means; an automatic distributor having several arms, each movable stepwise over a series of contacts, the respective recording contact groups of each of said number of groups being connected to the contacts of one of said series of distributor contacts, said groups thereby being successively and repeatedly current fed by said respective distributor arms upon rotation thereof; means for continuously stepwise advancing said distributor arms; finder means controlled by said distributor, connecting alternately each of said distributor arms in circuit so as to feed current alternately to each number of said recording contact groups after each rotation of said distributor; means whereby the selected line is connected to the calling line, means for releasing said distributor after a call has been been put through; means for holding the contact pairs recording the other composing call-signs while said communication takes place, and means for again setting in operation said distributor advancing means, when said communication is finished, to put through the respective other calls.

18. In a telephone set, the combination of a plurality of switch means for manually composing a call-sign, means for recording at least two call-signs at the same time, said means comprising for each call-sign a series of groups of recording relays controlled by said switch means, each recording relay acting on a contact pair, all in such a way that one recording relay is energized and thereby one contact pair closed in each involved group of a series for each composing element of a call-sign; two circuits for holding said recording relays of said two series after energizing thereof; means for transmitting call-sign impulses over said telephone line; control means connected to said recording contact pairs and controlling said impulse transmitting means depending on which of said recording relays have been actuated; an automatic distributor having at least two rotatable contact arms each moving stepwise over a series of contacts, the respective recording contact groups of each of said two series of groups being connected to one of the respective contacts of said series of distributor contacts, said groups thereby being successively and repeatedly connected to one of said two distributor arms upon rotation thereof; finder means comprising a rotary contact arm moving stepwise over a number of contacts, which are alternately connected to the one or the other of said two distributor arms, said finder contact arm thereby closing a circuit feeding current to one or the other of said series of recording relay contact groups for putting through one or the other of the two call-signs recorded; means actuated by a contact of said distributor on each rotation thereof following its zero position for advancing said finder contact arm one step; means actuated by a further contact of said distributor following its zero position for temporarily opening the telephone line; means for interrupting the action of said distributor when a free line has been selected; second finder means having a contact arm coupled to the first finder contact arm and moving stepwise over a number of contacts thereby alternately closing said holding circuits of said recording relays in such a way that when a call is being put through by means of one of said series of recording relay groups, the relays involved of said other series of recording relay groups are held; means for returning said finder contact arms to zero position after the first communication has taken place; and means actuated by the closing of a contact on said finder means as its arms return to zero position, for putting said distributor means again in operation in order to put through the second call.

19. A telephone set according to claim 18, comprising two control lamps controlled by said finder means and lighting up alternately according to which of said two recorded call-signs is being transmitted.

20. A telephone set according to claim 18, comprising a hand switch for connecting said finder means to said distributor after the first call-sign has been recorded and for disconnecting said finder means after the first call has been put through.

21. A telephone set according to claim 5, in which said switch means for manually composing a call-sign comprises a keyboard with a like number of keys as there are recording relays in a relay group, each key being provided with a verifying lamp, these verifying lamps being connected across said automatic second distributor means and said segmental contact means, whereby the verifying lamps corresponding to the keys which have been pressed at the time of composing the call-sign light up successively and repeatedly during the transmission of impulses.

22. A telephone set according to claim 6, in which said manually composing means comprises a keyboard, the keys of which are each provided with a verifying lamp, these verifying lamps being connected across said contact pairs and said control means, whereby the verifying lamps corresponding to the keys which have been pressed at the time of composing the call-sign light up successively and repeatedly during the transmission of impulses.

PIERRE KAELIN.

REFERENCES CITED

The following references are of record in the file of this patent:

UNITED STATES PATENTS

| Number | Name | Date |
|---|---|---|
| 1,332,961 | Tanner | Mar. 9, 1920 |
| 1,709,031 | McCoy | Apr. 16, 1929 |
| 1,960,129 | Tchoubritch | May 22, 1934 |
| 1,972,289 | Chauvean | Sept. 4, 1934 |
| 2,085,884 | Wilkinson | July 6, 1937 |
| 2,165,063 | MacKay | July 4, 1939 |
| 2,314,801 | Roberts | Mar. 23, 1943 |
| 2,323,019 | Dohle | June 29, 1943 |
| 2,333,195 | Ponliart | Nov. 2, 1943 |
| 2,402,341 | Patterson | June 18, 1946 |

FOREIGN PATENTS

| Number | Country | Date |
|---|---|---|
| 733,549 | France | Oct. 7, 1932 |